US005511965A

United States Patent [19]

Batdorf et al.

[11] Patent Number: 5,511,965

[45] Date of Patent: Apr. 30, 1996

[54] APPARATUS FOR EXTRUDING TUBING HAVING A VARIABLE OUTER DIAMETER

[75] Inventors: David B. Batdorf, Paso Robles, Calif.; Gregory N. Nordgren, Wilsonville, Oreg.; Charles A. Schryver, Atascadero, Calif.

[73] Assignee: Specialty Silicone Fabricators, Inc., Paso Robles, Calif.

[21] Appl. No.: 421,479

[22] Filed: Apr. 14, 1995

Related U.S. Application Data

[63] Continuation of Ser. No. 161,500, Dec. 1, 1993, abandoned, which is a continuation of Ser. No. 925,303, Aug. 3, 1992, abandoned, which is a division of Ser. No. 750,905, Oct. 11, 1991, abandoned.

[51] Int. Cl.[6] .................................................... B29C 47/22

[52] U.S. Cl. .................. 425/381; 264/167; 264/209.200; 264/209.800; 425/382.400; 425/465; 425/466

[58] Field of Search .................................... 425/380, 381, 425/382.4, 465, 466, 467; 264/167, 209.2, 209.8

[56] References Cited

U.S. PATENT DOCUMENTS

| | | | |
|---|---|---|---|
| 2,780,835 | 2/1957 | Sherman | 425/381 |
| 3,124,839 | 3/1964 | Adams | 425/465 |
| 3,134,832 | 5/1964 | Smith | 264/313 |
| 3,144,682 | 8/1964 | Thielfoldt | 425/381 |
| 3,147,515 | 9/1964 | Amsden | 425/381 |
| 3,209,404 | 10/1965 | Hagen | 425/466 |
| 3,446,884 | 5/1969 | Miller et al. | 425/466 |
| 3,480,999 | 12/1969 | Carlo | 425/381 |
| 3,540,094 | 11/1970 | Janssen | 425/381 |
| 3,850,568 | 11/1974 | Bartha et al. | 425/466 |
| 4,124,351 | 11/1978 | Garbuio | 425/466 |
| 4,626,183 | 12/1986 | Shirai et al. | 425/381 |
| 5,120,212 | 6/1992 | Reiber et al. | 425/466 |

*Primary Examiner*—Jay H. Woo
*Assistant Examiner*—Joseph Leyson
*Attorney, Agent, or Firm*—Michael G. Petit

[57] ABSTRACT

An apparatus for making extruded tubing having one or more lumens therein with a variable outer diameter. The apparatus is useful for forming tubing of an extrudable material such as an elastomer or thermoplastic. The extrudable material is forced around a mandrel and through a die aperture over a mandrel wherein the inside surface of the tubing is of uniform diameter along its length but the wall thickness varies throughout its length. Such an apparatus may be used, for example, to make kink-resistant tubing. In one embodiment, the aperture in the extrusion die has a variable diameter while the mandrel remains constant. In a second preferred embodiment, a moveable ring with a central aperture is disposed within the extrusion chamber coaxially with the mandrel. The ring is capable of reciprocal motion in the direction of extrusion. During extrusion, when the moveable ring is moved toward the die opening, it constricts the outer diameter of the tubing thus formed. When the ring is moved away from the die opening, the outer diameter of the extruded tubing increases to the full diameter of the die opening.

1 Claim, 1 Drawing Sheet

21
25
24
42
41

APPARATUS FOR EXTRUDING TUBING HAVING A VARIABLE OUTER DIAMETER

CROSS REFERENCE TO RELATED APPLICATIONS

This is a continuation of application Ser. No. 08/161,500, filed on Dec. 1, 1993, now abandoned, which is a continuation of application Ser. No. 07/925,303, filed on Aug. 3, 1992, now abandoned, which is a divisional of application Ser. No. 07/750,905, filed Oct. 11, 1991, now abandoned.

BACKGROUND OF THE INVENTION

1. Field of the Invention

This invention relates to extruded tubing and, in particular, to extruded tubing having either a constant or variable inner diameter and a variable outer diameter.

2. Prior Art

It has long been known in the art to form tubing having a corrugated wall structure to permit the tube to be easily flexed without buckling. However, such tubing structures have both interior and exterior surface irregularities and, as a result, when certain fluids are flowed therethrough, unwanted resistance to flow is affected by means of the irregular internal configuration. In addition such surfaces are difficult to clean.

To overcome these problems, Weigl, in U.S. Pat. No. 3,858,615, developed a kink-resistant hose construction. Weigl's hose is a flexible tube having a very thin wall relative to the inside diameter of the tube, and a series of axially spaced reinforcing rings of the same material as the tube integrally formed on the outer surface of the tube wall. The inner surface of the tube wall, being smooth and substantially cylindrical enables unimpeded flow therethrough and facilitates easy cleaning. The unsupported portion of the tube wall between successive reinforcing rings flexes readily. When a severe bending force is applied, the wall portion between rings folds inwardly toward the axis of the tube. The reinforcing rings are spaced such that such extreme bending brings adjacent reinforcing rings in contact with each other to prevent closure of the passage.

While Weigls kink-free tubing established the value of a tubing having a uniform interior diameter along its length and a periodically varying outer diameter, until now the method for making such tubing has been limited to molding. Molds are useful for making short sections of tubing but impractical for making long lengths of tubing. It is, therefore, desirable to provide a method for continuously extruding a tube having a uniform inner diameter and a variable-outer diameter.

SUMMARY OF THE INVENTION

An object of the invention is to provide continuous tubing of any length laving a uniform inner diameter and a variable outer diameter along its length.

It is another object of the invention to provide a method and apparatus for the continuous extrusion of a tubing having a uniform inner diameter and a variable outer diameter along its length.

It is still a further object of this invention to make an extruder apparatus capable of forming an extrudable material into a tubing having a variable inner diameter and a variable outer diameter along its length.

These and other objects of the invention will become apparent in view of the drawings and description of the preferred embodiment.

DESCRIPTION OF THE PREFERRED EMBODIMENT

Figure 1:
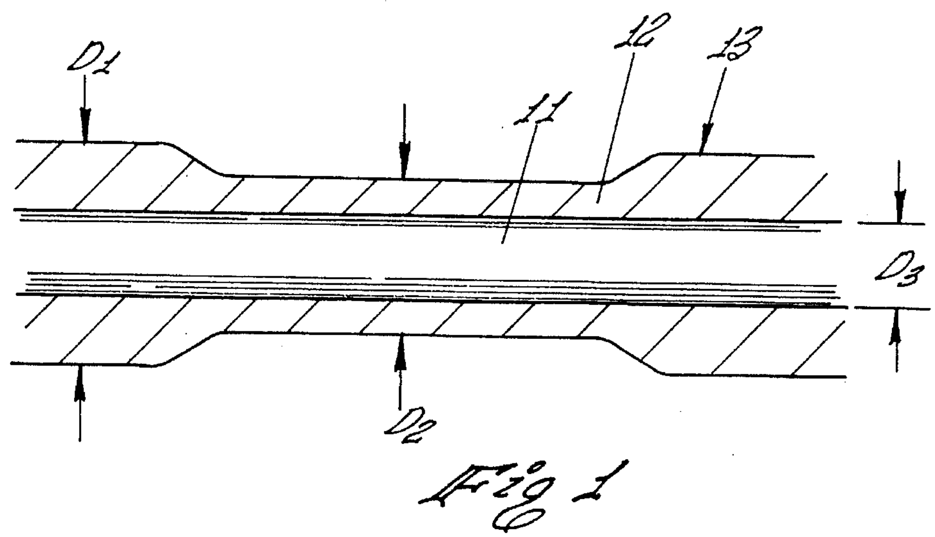
FIG. 1. A longitudinal cross-section of a segment of continuous tubing of the present invention.

A longitudinal cross section of a segment of tubing made in accordance with the present invention is shown in FIG. 1. Such tubing, generally indicated at 13, is conveniently characterized by an inner diameter D3 and a wall thickness varying between (D1–D3) and (D2–D3). While the wall 12 of the tubing may be fabricated from any extrudable material such as a metal, thermoplastic or an elastomer, the preferred embodiment is most conveniently made of a silicone rubber. In the preferred embodiment the wall of the inner lumen 11 of the tubing 13 is smooth and preferably cylindrical. The configuration of the inner lumen is, however, a matter of choice inasmuch as methods of varying the diameter of the inner lumen while keeping the wall thickness constant are well known in the art. The important feature of the invention is that the extruded variable outer diameter tubing may be made as a unitary structure in any length.

Figure 2:
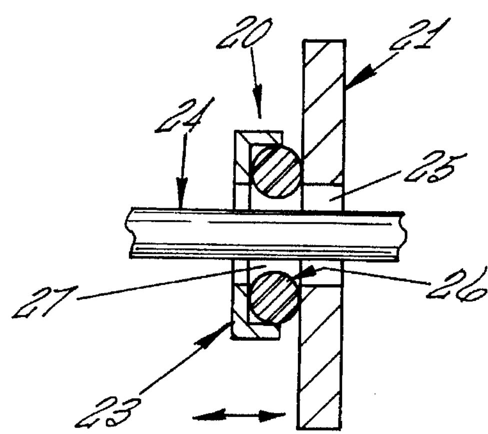
FIG. 2. A cross-sectional view of an embodiment of an extruder head using a compressed "O" ring to vary the outer diameter.

Turning now to FIG. 2, a portion of an extruder head is shown in cross section. An extruder head is comprised of an extruder chamber (not shown) and a die 21 and mandril 24. The extrudable material is normally forced through the aperture in the die 25 around the mandril 24. In FIG. 2, an "O" ring with a second aperture therein 27 is placed behind the die and pressed against the die by means of a backing plate 23. Pressure against the backing plate in the direction of the die, that is, in the direction of extrusion, compresses the "O" ring to force the second aperture 27 closed. As the backing plate is moved away from the die, the "O" ring assumes its normal rest configuration and the aperture 27 opens. Reducing the second aperture 27 by pressing the "O" ring 26 reduces the outer diameter of the tubing while releasing the pressure from the backing plate opens the second aperture 27 thereby increasing the outer diameter of the extruded tubing.

Figure 3:
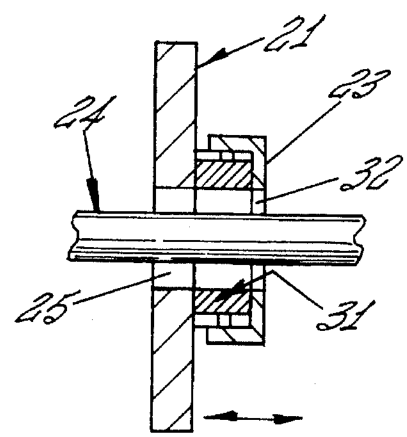
FIG. 3. A cross-sectional view of an embodiment of an extruder lead using a compressed flexible sleeve to vary the outer diameter.

Turning now to FIG. 3, we see a cross section of an extruder head similar to that shown in FIG. 2 except that the O ring is replaced by a section of flexible sleeve 31. The flexible sleeve is disposed against the die on the side facing in the direction of extrusion. The flexible sleeve is held against the die by means of a backing plate 23. If it is desired to narrow or decrease the outer diameter of the extruded tubing, the backing plate is pressed in the direction of the die thereby closing the aperture 32 therewithin. If the outer diameter of the tubing is to be increased, the backing plate 23 is moved away from the die. It is clear from the foregoing that the "O" ring 26 and the flexible sleeve 31 can be placed on either side of the die 21 with similar effect.

Figure 4:
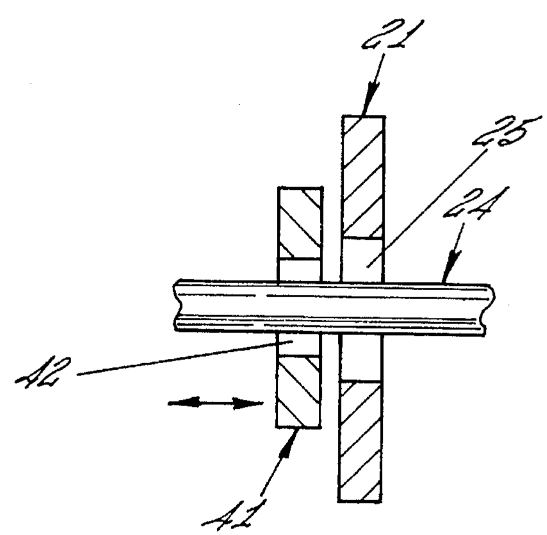
FIG. 4. A cross-sectional view of an embodiment of an extruder head-using a movable ring to vary the outer diameter.

A further example of an extruder lead Suitable for making extruded tubing of variable outer diameter is shown in FIG. 4. This extruder head comprises a die 21 with an aperture 25 and a mandril 24. A third member, a moveable ring 41 having a ring aperture 42 therewithin which is smaller than the die aperture, is disposed within the extruder cavity behind the die 21. The moveable ring 41 is capable of translational motion only along the axis of extrusion. Moving the moveable ring 41 towards the die reduces the effective aperture 25 and decreases the outer diameter of tubing extruded therefrom whereas sliding the moveable ring away from the die opens the effective aperture 25 to increase the outer diameter of tubing extruded therethrough. Placement of a cam or push-rod assembly behind the moveable ring to induce oscillatory motion in the moveable ring produces an extruded tubing having periodic large and small outer diameters and a uniform inner diameter.

During extrusion, if the moveable ring 41 is pushed closer to the die 21, the flow of extruding material is not only restricted around the ring 41 but it is also forced through the inner aperture 42 of the moveable ring. Changing the diameter of the aperture 42 will, of course, also effect the outer diameter of the extruded tubing.

The above embodiments are given by means of example. The scope of the invention is not limited to the specific examples of the embodiments provided herein but should be interpreted according to the scope of the claims appended hereto.

What we claim is:

1. A die for an extrusion apparatus operable for making art extruded tubular article from an extrudable material by forcing the extrudable material through the die thereafter to exit the die in a direction defining a flowstream and wherein the tubular extruded article has an outer surface and art inner lumen, the die comprising a chamber having an entry port through which entry port extrudable material enters said chamber, the die further comprising:

(a) a circular die aperture having a diameter and lying in a plane perpendicular to the direction of the flowstream, said circular die aperture being operable for permitting extrudable material to exit said chamber by passing therethrough;

(b) a mandrel deployed within said chamber having a lumen-shaping portion projecting into said circular die aperture and wherein said lumen-shaping portion of said mandrel has an outer diameter and is operable for shaping the inner lumen of the tubular extruded article;

(c) a moveable ring comprising an annular member having an outer diameter greater than the diameter of said circular die aperture, and a circular ring aperture therewithin, and said circular ring aperture having a diameter less than the diameter of said circular die aperture and greater than the diameter of said lumen-shaping portion of said mandrel wherein said moveable ring is slideably mounted within said chamber upstream with respect to said circular die aperture and encircling said lumen-shaping portion of said mandrel so that at least a portion of said lumen-shaping portion of said mandrel is disposed within said circular ring aperture;

(d) sliding means operable for reciprocally moving said movable ring along a line parallel to the direction of the flowstream, the reciprocal motion of the movable ring being operable for increasing and decreasing the outer diameter of the tubular extruded article, and said movable ring dimensioned and positioned within the chamber so that extrudable material must pass both around said outer diameter of said moveable ring and through said circular ring aperture before entering said circular die aperture.

* * * * *